United States Patent Office 3,563,681
Patented Feb. 16, 1971

3,563,681
ELECTROTHERMAL FURNACE CONTROL
Hans G. Hirsbrunner, Attleboro, Mass., assignor to Texas Instruments Incorporated, Dallas, Tex., a corporation of Delaware
Filed June 30, 1969, Ser. No. 837,823
Int. Cl. F23h 5/00
U.S. Cl. 431—66                                21 Claims

ABSTRACT OF THE DISCLOSURE

Apparatus for controlling the operation of a furnace having an electrically energizable fuel valve which, when energized, supplies fuel to the furnace burner. An ignition circuit generates recurrent sparking, when energized, upon the demand of a thermostat, and ceases to generate sparking after ignition of the fuel. A triac is connected for energizing the fuel valve. A triggering circuit for the triac causes triggering thereof only if the ignition circuit generates sparking. A thermistor prevents triggering of the triac if heated above a predetermined threshold. Means for heating the thermistor is energized to cause heating thereof when the ignition circuit generates sparking, the thermistor requiring a predetermined heating time interval to reach its threshold temperature causing termination of triggering of the triac if the fuel is not ignited within this interval.

---

Figure 1:
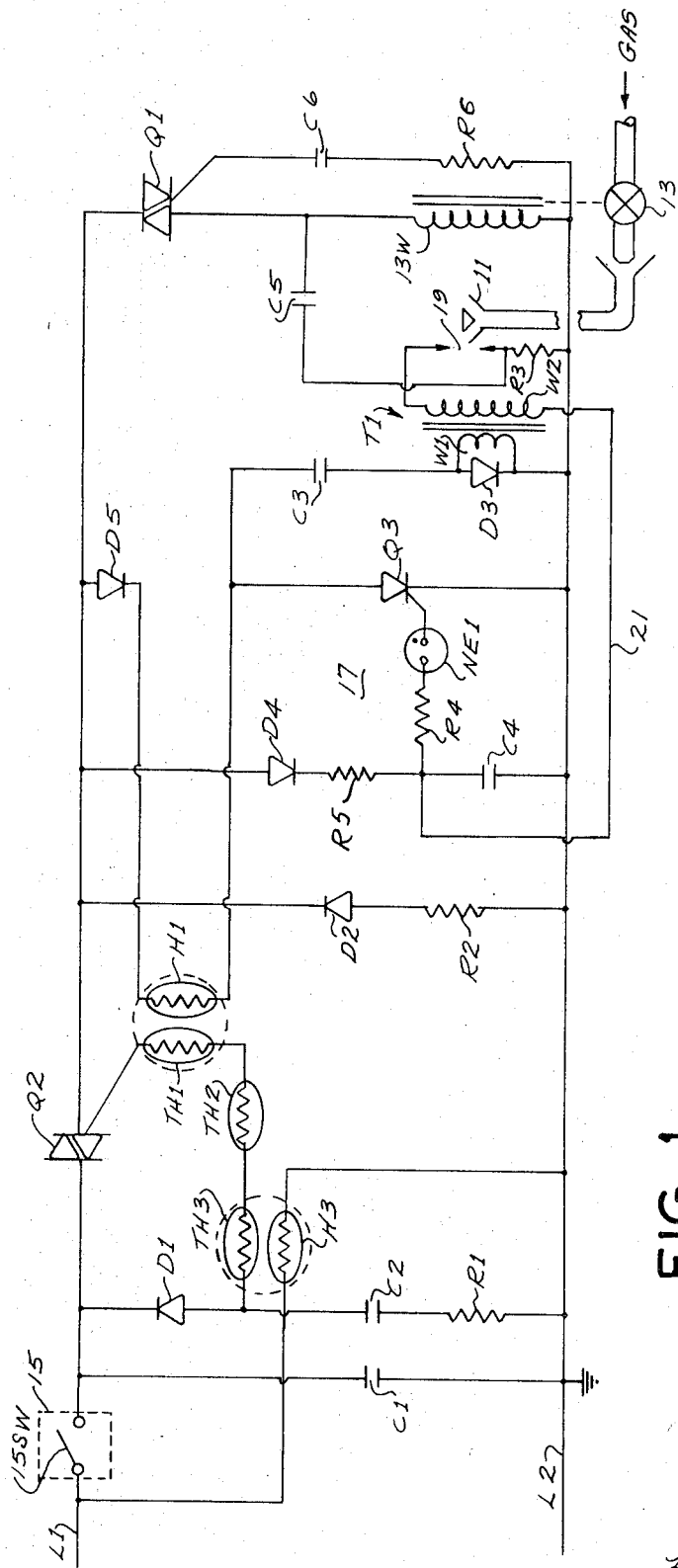

This invention relates to apparatus for controlling the operation of a furnace and more particularly to improved furnace control apparatus for carrying out various required furnace control and protective functions through the use of solid-state electrothermal circuitry.

Apparatus of the present invention constitutes an improvement of the electrothermal furnace control disclosed in application Ser. No. 822,901, filed May 8, 1969, as well as the improved furnace controls which were the subject of application Ser. No. 822,902, filed May 8, 1969 and Ser. No. 836,068, filed June 24, 1969. In the furnace controls described in each of the aforesaid disclosures an electrically energizable fuel valve supplies fuel to the furnace burner when the valve is energized. A triggerable semiconductor current-switching device is employed to energizing the fuel valve. Triggering of the switching device occurs upon energization of an ignition circuit which is operable, when energized, to supply recurrent sparking for igniting the fuel. Triggering of the switching device occurs upon energization of an ignition circuit which thermal timer if ignition does not occur within a predetermined time interval. Such circuitry, while generally safe and reliable in operation because of the operation of this electrothermal timer, nevertheless makes it possible for the fuel valve to be energized makes it possible for the fuel valve to be energized for this predetermined interval in the event that the ignition circuit is energized but sparking is not generated. It is desired, for maximum safety, that triggering of the switching device take place only if there is actual sparking across the spark electrodes.

Furthermore, while the provision of such an electrothermal timer serves to provide this type of apparatus with relative insensitivity to variations in ambient temperature and supply voltage, nonetheless variations in ambient temperature do cause some variation in the time interval determined by the electrothermal timer.

Accordingly, among the several objects of the invention may be noted the provision of such apparatus in which energization of the fuel valve may occur only if the ignition circuit first generates sparking; the provision of such apparatus having an improved electrothermal timer arrangement providing great insensitivity to variations in ambient temperature; the provision of such apparatus for controlling a furnace with an extremely high degree of safety and reliability; and the provision of such apparatus which is easily and economically manufactured. Other objects and features will be in part apparent and in part pointed out hereinafter.

Briefly, apparatus of the present invention controls the operation of a furnace in response to the demand of a thermostat sensing the temperature in a zone heated by the furnace. The furnace includes an electrically energizable fuel valve which, when energized, supplies fuel, e.g., gas, to the furnace burner. The apparatus includes an ignition circuit which, when energized, generates recurrent sparking to cause ignition of the fuel. This ignition circuit is energized when the thermostat demands heat and is operative to cease generating sparking after ignition of the fuel. Interconnected with the fuel valve is a triggerable semiconductor current-switching device which, when triggered, is conductive to cause energization of the fuel valve. Circuitry is included which functions as means for initially triggering the switching device only if said ignition means generates sparking and then operates to cause continued triggering of the switching device after the initial triggering as long as the thermostat demands heat. A thermistor is connected in such a way that it prevents triggering of the switching device when the thermistor is heated above a predetermined threshold temperature. Means for heating the thermistor is interconnected with the ignition circuit and is energized to cause heating of the thermistor when the ignition circuit generates sparking. Upon heating, the thermistor requires a predetermined heating time interval to reach its said threshold temperature. Thus, if the fuel is not ignited within said predetermined interval, triggering of said switching device is terminated to prevent fuel from being further supplied to the burner.

In another aspect of the invention, a second means for heating the thermistor is adapted to be continuously energized so that, in the absence of heating of the thermistor by the first heating means, it maintains the temperature of the thermistor substantially above ambient temperature but below the threshold temperature thereof. Accordingly, the heating time interval which is required for the thermistor to reach its threshold temperature upon heating is substantially unaffected by variations in ambient temperature.

Figure 2:
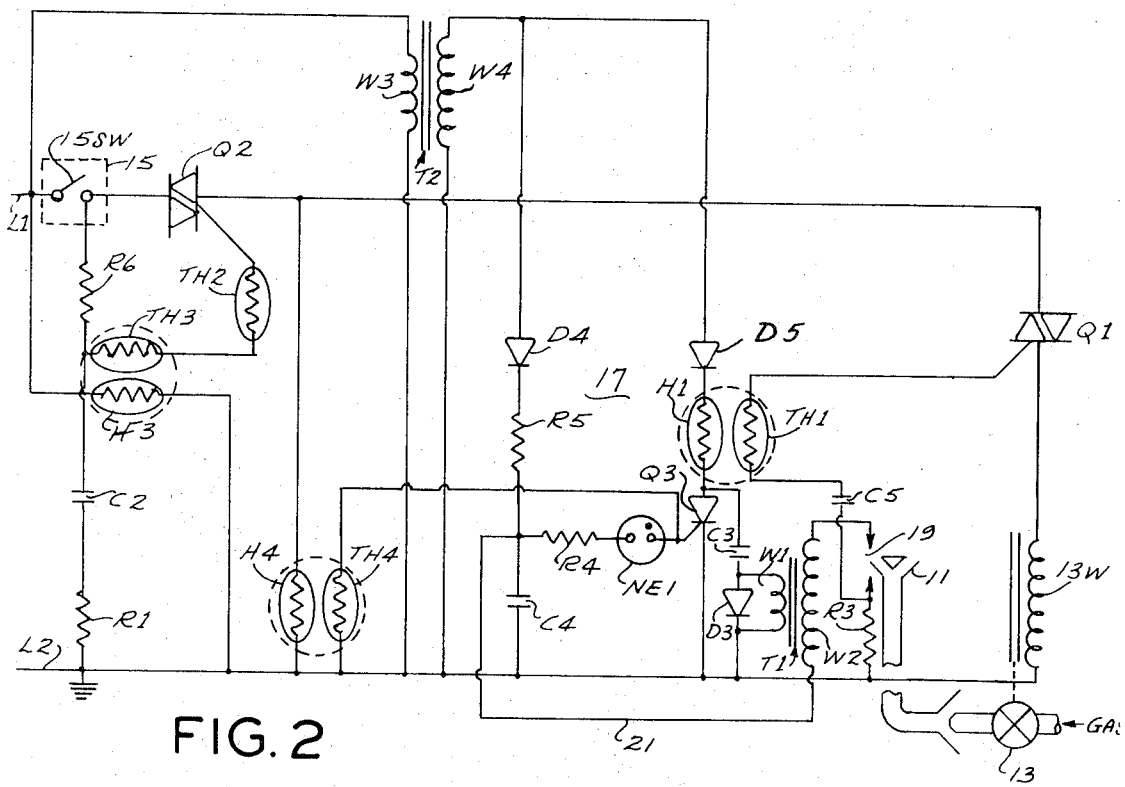
Figure 3:
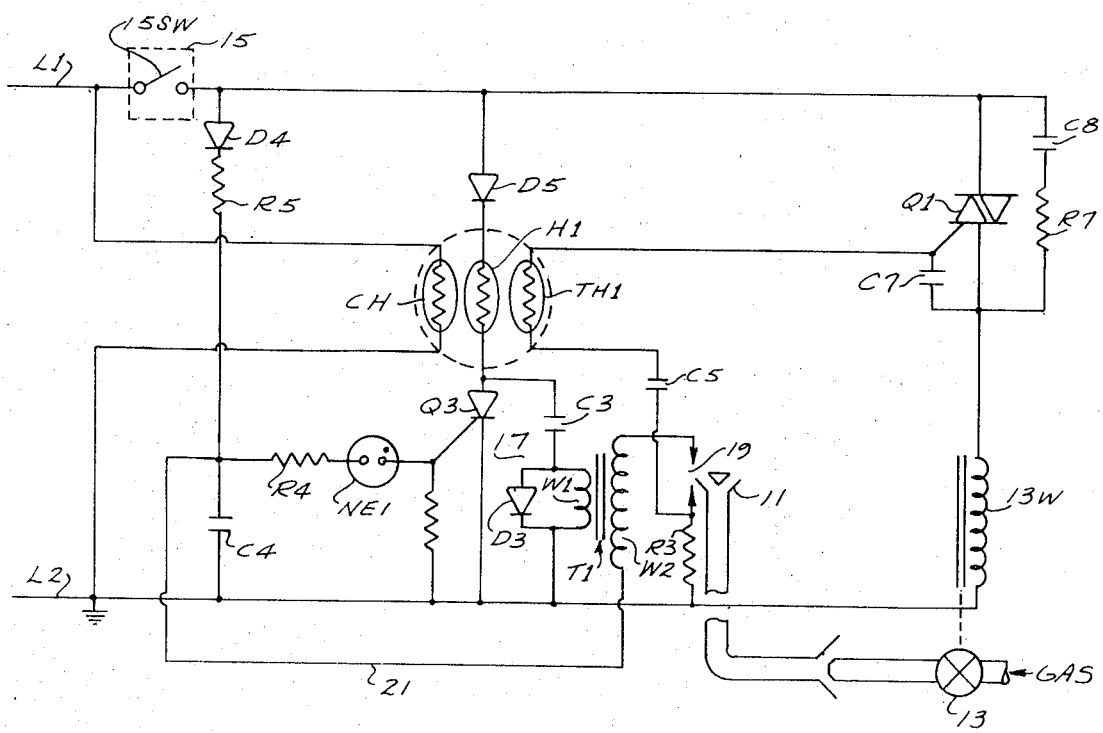

In the accompanying drawings in which are illustrated three of various possible embodiments of the invention, FIG. 1 is a circuit schematic diagram of a first embodiment of furnace control apparatus of the present invention employing a first type of electrothermal timing arrangement;

FIG. 2 is a schematic circuit diagram of a second embodiment of apparatus of this invention employing a second type of electrothermal timing arrangement; and FIG. 3 is a circuit schematic diagram of a third embodiment of the invention employing a third type of electrothermal timing arrangement which reduces sensitivity to undesirable variations in timing caused by changes in ambient temperature.

Corresponding reference characters indicate corresponding parts throughout the several views of the drawings.

Referring now to the drawings, and more particularly to FIG. 1, there is illustrated a first embodiment of an electrothermal furnace control of the present invention which is adapted to control a furnace such as a gas-fired, forced-hot-air furnace of the type conventionally used for residential heating. The furnace has a burner, illustrated generally at 11, to which gas is supplied for combustion when a solenoid-operated gas valve 13 is opened by energization of its winding 13W. Combustion at burner 11 supplies heat to a plenum of the furnace. The furnace is of the type wherein a forced-air draft is provided to the burner, as by a conventional blower fan. The furnace is of the same general type as is shown and described in the aforesaid application Ser. No. 822,901. The furnace is controlled by the present apparatus in response to the demand of the usual thermostat 15 including a switch 15SW which is closed to indicate a demand for heat. A pair of leads L1 and L2 are provided for connection to a source of A.C. power at a suitable voltage, e.g., line voltage of 115 v. A.C., this potential being supplied to the apparatus by the closing of switch 15SW when the thermostat demands heat.

Gas valve winding 13W is connected in a series circuit across leads L1 and L2 including thermostat switch 15SW and the main terminals of a respective pair of triacs Q1 and Q2 which, as is known to those skilled in the art, are triggerable semiconductor current-switching devices. Such a device is conductive on successive half-cycles of the A.C. waveform applied across its main terminals when a triggering current of sufficient magnitude is supplied to its triggering or gate terminal. A transient-filtering capacitor C1 is connected across leads L1 and L2.

A triggering circuit for triac Q2 includes a trio of thermistors TH1, TH2 and TH3 series-connected between the gate terminal of triac Q2 and, through a diode D1, lead L1 to provide a triggering circuit for initially triggering triac Q2. The thermistors are also connected by means of a capacitor C2 and a resistor R1 to lead L2 to provide a latching circuit for causing continued triggering a triac Q2 after it has been initially triggered. When triggered, triac Q2 supplies a voltage across triac Q1 and gas valve winding 13W and supplies power to an ignition circuit described hereinafter.

Thermally coupled to thermistor TH1 is a heater thermistor H1 which provides means for heating thermistor TH1. Thermistor TH1 has a positive temperature coefficient of resistivity (PTC) and preferably has a well-defined transition temperature, e.g., 80° C., above which the resistance thereof increases relatively abruptly so that, when heated above a threshold temperature corresponding to its transition temperature, it prevents or terminates triggering of triac Q2. Thermistor H1 is also a PTC thermistor preferably having a well-defined transition temperature, e.g., 120° C., above which its resistance increases relatively abruptly so that, upon energization, thermistor H1 self-heats. Upon being heated by thermistor H1, thermistor TH1 requires a predetermined heating time interval, e.g., 4–10 seconds, to reach its threshold temperature. In effect, then, thermistors TH1 and H1 together constitute an electrothermal timer.

Thermistor TH2 is a PTC thermistor, also preferably having a well-defined transition temperature above which the resistance thereof increases relatively abruptly. Thermistor TH2 is located in the plenum of the furnace for sensing the temperature therein, and when heated above a predetermined threshold temperature corresponding to the maximum permissible temperature in the plenum, it is also adapted to terminate or prevent triggering of triac Q2.

Thermistor TH3 is also a PTC thermistor preferably of the same type and having a well-defined transition temperature of, for example, 80° C., above which its resistance increases relatively abruptly. It is likewise adapted to prevent triggering of triac Q2 when heated above a threshold temperature corresponding with its transition temperature. Thermally coupled to thermistor TH3 to provide means for heating the latter is a heater thermistor H3 connected across leads L1 and L2 so that it is continuously energized as long as leads L1 and L2 are connected to the A.C. supply. Thermistor H3 is also a PTC thermistor and preferably has a well-defined transition temperature, e.g., 120° C., above which its resistance increases relatively abruptly so that it self-heats upon energization and is maintained substantially at its transition temperature. The pair of thermistors TH3 and H3 together constitute a draft sensor or air-flow sensor and are suitably mounted in a furnace air draft duct or in conjunction with a draft blower of the furnace so that thermistor TH3 will be cooled by the forced-air draft provided by the burner. Thermistor H3 normally supplies insufficient heat to heat thermistor TH3 above its transition temperature as long as there is sufficient forced-air draft but causes heating of thermistor TH3 above a predetermined threshold temperature corresponding to its transition temperature, thereby preventing or causing cessation of triggering of triac Q2 to prevent energization of gas valve winding 13W and ignition circuit 17, in the event of insufficient forced-air draft provided to the furnace burner.

A series-connected diode D2 and a resistor R2 are connected between one of the main terminals of triac Q2 and lead L2 to provide a controlled turn-on current for triac Q2. An ignition circuit indicated generally at 17 is operative, when energized by triggering of triac Q2, to generate recurrent sparking across a pair of electrodes 19 for igniting the gas supplied to burner 11. Ignition circuit 17 includes a triggerable semiconductor current-switching device constituted by a silicon controlled rectifier (SCR) Q3 having its anode and cathode terminals connected in a circuit with a capacitor C3 and the primary winding W1 of a conventional spark transformer T1. The winding W1 is shunted by a diode D3 to reduce charging time constant of capacitor C3. Spark transformer T1 includes a high-voltage winding W2 interconnected with one of the pair of electrodes 19, the other of the electrodes being connected through a resistor R3, for a purpose which will be made clear, to lead L2. Interconnected with the gate or triggering terminal of SCR Q3 are a neon bulb NE1, a resistor R4 and a capacitor C4, one side of capacitor C4 being connected to lead L2. A lead 21 provides a connection from the junction of capacitor C4 and resistor R4 to one side of high-voltage winding W2 for a special purpose which will be explained. A diode D4 and a resistor R5 are provided to supply current for charging capacitor C4 when power is supplied to the ignition circuit 17 upon triggering of triac Q2. Heater thermistor H1 is series-connected with a diode D5 to supply power across the cathode and anode terminals of SCR Q3 upon triggering of triac Q2.

Interconnecting one side of resistor R3 and the main terminal of triac Q1 which is connected to one side of fuel valve winding 13W is a capacitor C5 which functions to permit initial triggering of triac Q1. Interconnecting the gate terminal of triac Q1 and lead L2 are a series-connected capacitor C6 and resistor R6 which are employed for causing triggering of triac Q1 following its initial triggering of capacitor C5.

In the operation of the control of FIG. 1, it is assumed that leads L1 and L2 are connected to a source of power of appropriate voltage, e.g., 115 v. A.C. It is further assumed that a sufficient forced-air draft is being satisfactorily provided to the burner and that the plenum of the furnace is not overheated, that is to say, is not above a maximum permissible temperature. Accordingly, thermistors TH1, TH2 and TH3 are each relatively cool and therefore exhibit a relatively low series resistance which will permit triggering current to be supplied to triac Q2. Thus when the contacts of thermostat switch 15SW close, indicating a demand by the thermostat for heat, a triggering current is supplied through diode D1 and the series-connected thermistors TH1–TH3 to cause triggering of triac Q2. This supplies voltage across triac Q1 and gas valve winding 13W and this voltage is also applied, by means of the path through diode D5 and heater thermistor H1, across the anode and cathode terminals of SCR Q3 of ignition circuit 17. Thus SCR Q3 is forward biased on alternate half-cycles of the applied A.C. waveform. The low resistance path through diode D5 and thermistor H1 permits capacitor C3 to quickly charge to peak voltage. Simultaneously, current is supplied through diode D4 and resistor R5 to charge capacitor C4. When the voltage across capacitor C4 reaches the breakdown potential of neon bulb NE1, the latter conducts to supply a triggering current to the gate terminal of SCR Q3 for causing triggering thereof. When SCR Q3 thus conducts, capacitor C3 is discharged through primary winding W1 of transformer T1. Secondary winding W2 steps up the voltage across winding W1 to cause sparking across electrodes 19. Each time capacitor C4 reaches the breakdown voltage of neon bulb NE1, which occurs many times per second, the latter conducts, causing repetitive triggering of SCR Q3 and thus providing recurrent sparking across electrodes 19. The current which flows through resistor R3 upon sparking across electrodes 19 causes a voltage drop across resistor R3. The voltage which thus appears across the resistor is coupled through capacitor C5 to the main terminal of triac Q1 to which capacitor C5 is connected, causing this main terminal to be momentarily more negative than the gate terminal thereof. This initially triggers triac Q1 which thereby energizes gas valve winding 13W to supply gas to burner 11. The recurrent sparking across electrodes 19 ignites the gas and the presence of flame and electrodes 19 provides a conductive path thereacross. Because of lead 21, this conductive path discharges capacitor C4 and causes it to remain discharged so long as combustion continues. Accordingly, when ignition occurs, SCR Q3 ceases to be triggered and ignition circuit 17 accordingly ceases to generate sparking.

From the above, it will be appreciated that, since triggering of triac Q1 cannot take place until sparking across electrodes 19 induces a voltage across resistor R3, energization of gas valve winding 13W is absolutely prevented in the absence of sparking across electrodes 19. This provides an extremely high degree of safety in insuring that absolutely no gas will be permitted to accumulate at burner 11.

When triggering of SCR Q3 ceases and therefore sparking across electrodes 19 is terminated, continued triggering for triac Q1 is provided. Because of the inductive reactance of gas valve winding 13W, there is a sudden change of voltage across winding 13W each time triac Q1 ceases to conduct. This voltage change is applied to the gate terminal of Q1 through capacitor C6 and causes triac Q1 to be triggered after triggering of SCR Q3 ceases. Such triggering continues so long as voltage is applied across triac Q1 and gas valve winding 13W by triggering and conduction of triac Q2.

With respect to triac Q2, triggering is maintained by the "latching" circuit of capacitor C2 and resistor R1 in a manner similar to triggering of triac Q1. The capacitive reactance of capacitor C1 causes a voltage to be developed across capacitor C1 which is out of phase with respect to the voltage developed across winding 13W in the circuit including the main terminals of triac Q2 as a result of the inductive reactance of the winding. These voltages are sufficiently out of phase to cause continued triggering of triac Q2.

From the above it will have been observed that, by virtue of the series connection of heater thermistor H1 with the cathode and anode terminals of SCR Q3, thermistor H1 is energized concomitantly with the ignition circuit 17. Thus, upon triggering of SCR Q3, thermistor H1 begins to heat thermistor TH1. If ignition does not occur so that triggering of SCR Q3 continues, thermistor TH1 continues to be heated by thermistor H1. After the aforesaid predetermined heating time interval, i.e., 4–10 seconds, to reach its threshold temperature, the resistance of thermistor TH3 increases sufficiently to prevent further triggering of triac Q2. When triggering of triac Q2 ceases, gas valve winding 13W is deenergized to prevent fuel from being further supplied to the burner. At the same time, ignition circuit 17 is also deenergized.

Gas valve winding 13W is also deenergized if the plenum of the furnace should overheat. Such over-heating causing thermistor TH2 to be heated above the threshold temperature at which it will prevent triggering of triac Q2. If triac Q2 ceases to be triggered, the power circuit for gas valve winding 13W is opened and thus the gas valve winding is protectively deenergized to prevent gas from being further supplied to the burner. Similarly, if there should be insufficient forced-air draft supplied to burner 19, thermistor TH3 will heat above its threshold temperature and likewise cause triggering of triac Q2 to cease.

Since it is assumed that thermostat 15 continues to demand heat following protective deenergization of the gas valve as a result of the heating of any one of thermistors TH1, TH2 or TH3, then as soon as the thermistor which caused triggering of triac Q2 to cease initially has re-cooled, triac Q2 may once more be triggered. Accordingly, the control automatically resets for a new ignition trial after the appropriate thermistor has cooled regardless of which of the three thermistors caused triggering of triac Q2 to cease in the first place.

A second embodiment of the invention is illustrated in FIG. 2. A somewhat different electrothermal timing arrangement is provided in that the sensor thermistor TH1 of the electrothermal timer pair of thermistors TH1 and H1 is interconnected between capacitor C5 and the gate terminal of triac Q1, rather than being in the gate circuit of triac Q2 as in the control of FIG. 1. A current-limiting resistor R6 is instead included in the triggering circuit for triac Q2. Further, a step-up transformer T2 is provided having its low voltage winding W3 connected across leads L1 and L2 which, in this control, are preferably connected across a 24 v. A.C. source, rather than line voltage of 115 v. A.C. as is preferred with the FIG. 1 control. The secondary winding W4 steps up this relatively low voltage to, e.g., 115 v. A.C. This stepped-up voltage is supplied to ignition circuit 17 by means of diode D4 and resistor R5 for charging capacitor C4. Through diode D5, this voltage is applied across the anode and cathode terminals of SCR Q3 as well as being supplied for charging capacitor C3.

From the above, it may be noted that voltage is always supplied to ignition circuit 17. However, triggering of SCR Q3, and thus energization of the ignition circuit, is prevented by a thermistor TH4 interconnecting the gate terminal of SCR Q3 and lead L2. Thermistor TH4 is a PTC type of thermistor, preferably having a transition temperature of 80° C., for example, above which its resistance increases relatively abruptly. Thermally coupled to thermistor TH4 to provide means for heating the latter is a heater thermistor H4 connected between one of the main terminals of triac Q2 and lead L2 for energization when triac Q2 is triggered upon a demand by the thermostat 15 for heat. Preferably it too is a PTC type of thermistor having a transition temperature somewhat higher, e.g., 120° C., than that of thermistor TH4. Until heated by thermistor H4, the resistance of thermistor TH4 is relatively low and accordingly shunts triggering current for SCR Q3 to lead L2.

In operation, the closing of thermostat switch 15SW causes triggering of triac Q2, thus supplying voltage across triac Q1 and gas valve winding 13W. This also energizes heater thermistor H4, causing heating of thermistor TH4. After a predetermined interval, preferably several seconds in duration, sufficient to permit purge by the forced draft of any possible accumulation of gas at burner 11, thermistor TH4 reaches the threshold temperature at which its resistance is sufficiently high to permit triggering current to be supplied to the gate terminal of SCR Q3. Thermistors TH4 and H4 thus act as a purge delay timer. Triggering of SCR Q3 causes sparking to be generated across electrodes 19. The voltage thereby induced across resistor R3 causes triggering current to be supplied through capacitors C5 and thermistor TH1 to the gate terminal of triac Q1. Triggering of triac Q1 energizes gas valve winding 13W to supply gas to burner 11 and the recurenrt sparking across electrodes 19 causes ignition of the fuel. Connection 21 again provides for discharge of capacitor C4 upon ignition of the gas as a result of the conductive path across electrodes 19 and thus triggering of SCR Q3 terminates.

If, however, ignition is not successful, continued energization of thermistor H1 causes heating of thermistor TH1. After the predetermined interval, e.g., 4–10 seconds, required for thermistor TH1 to reach its threshold temperature, triggering of SCR Q1 is terminated, deenergizing gas valve winding 13W to prevent gas from being further supplied to burner 11. However, the voltage supplied by winding W4 continues to energize ignition circuit 17 and thus sparking continues at electrodes 19 to insure that any gas which might be present at burner 11 will be ignited and burned rather than being permitted to accumulate dangerously. Continued triggering of SCR Q3 causes heater thermistor H1 to remain energized by the current therethrough. Self-heating of thermistor H1 causes its resistance to increase until the thermistor is maintained substantially at its transition temperature. It therefore has an increased resistance which reduces the level of energization of the ignition circuit and causes capacitor C3 to charge at a somewhat lower rate. Accordingly, SCR Q3 is triggered somewhat less frequently and thus sparking across electrodes 19 continues to be generated but at a reduced sparking rate. This advantageously prevents erosion of the electrodes and yet permits thermistor TH1 to remain heated for preventing triggering of triac Q1. Gas valve winding 13W therefore remains deenergized if ignition does not occur.

In a manner similar to the operation of FIG. 1, heating of thermistor TH2, because of excessive plenum temperature, or thermistor TH3, because of insufficient forced-air draft provided to burner 11, also terminates or prevents triggering of SCR Q2 and thereby prevents triggering of SCR Q1 and energization of gas valve winding 13W.

From the foregoing, it may be seen that the FIG. 2 control remains "locked-out" of operation following an unsuccessful ignition trial and may only be manually reset for a new ignition trial by disconnecting either or both leads L1 and L2 from the source of power or by causing the thermostat switch 15SW to open. However, if gas valve winding 13W is deenergized as a result of heating of thermistors TH2 or TH3 resulting from excessive plenum temperature or an insufficient forced draft, reset is automatic since, as soon as the appropriate thermistor TH2 or TH3 has cooled, triac Q2 is once more retriggered. Accordingly, after a purge delay during which thermistor TH4 is heated by thermistor H4 to its threshold temperature, triggering of SCR Q3 once more occurs. The resultant sparking across electrodes 19 again causes triggering of triac Q1, reenergizing gas valve winding 13W.

Rather than being interconnected with the gate terminal of triac Q1, thermistor TH1 may instead be located in the gate circuit of triac Q2, as it is in the control shown in FIG. 1. In this case, the circuit would automatically reset following a protective deenergization of gas valve winding 13W resulting from an unsuccessful ignition trial.

FIG. 3 illustrates a third embodiment of the invention. This control is similar to the control of FIG. 2 in having thermistor TH1 of the electrothermal timer interconnected with the gate terminal of triac Q1 and through capacitor C5 to the one of the electrodes 19 which is connected through resistor R3 to lead L2. The triggering circuit for triac Q1 also includes a capacitor C7 interconnected between the gate terminal of triac Q1 and its adjacent main terminal. A conventional "snubber" or transient suppression circuit including a capacitor C8 and resistor R7 is connected across the main terminals of triac Q1. A heater thermistor H1 is thermally coupled to thermistor TH1, as in the FIG. 2 control, to provide a first means for heating thermistor TH1. Thermistor H1 is energized by current drawn therethrough by triggering of SCR Q3 in the manner previously described. Also thermally coupled to thermistor TH1 to provide a second means for heating the latter is another heater thermistor CH connected across leads L1 and L2 so that it is continually energized so long as leads L1 and L2 are connected to a suitable A.C. source which, in this embodiment, is preferably 115 v. A.C. line voltage. As will be seen, thermistor CH acts to compensate for variations in ambient temperature.

As in the previous two embodiments, thermistors TH1 and H1 are both PTC thermistors preferably having transition temperatures, in this embodiment, of approximately 95° C. and 120° C., respectively, above which the resistance thereof increases relatively abruptly. Thermistor CH is also a PTC type of thermistor and has a transition temperature of 80° C., for example, above which its resistance increases relatively abruptly. Thus, the transition temperature of thermistor CH is somewhat less than the transition temperatures of either of thermistors TH1 or H1, but is substantially greater than the highest normally expected ambient temperatures, which might be expected to vary, just as an example, from 10 to 30° C., more or less. Thermistor CH is energized by the voltage across leads L1 and L2 and therefore self-heats due to internal resistive consumption of power. Since its resistance increases relatively abruptly at the transition temperature, it is therefore maintained by self-heating substantially at its transition temperature. Accordingly thermistor CH maintains thermistor TH1 approximately at the transition temperature of CH, i.e., 80° C. in this instance. Normally, this has no effect on the operation of the control, but, as will be made clear, acts to reduce variations in timing of the electrothermal timer pair of thermistors TH1 and H1 caused by variations in ambient temperature in the event of an unsuccessful ignition trial.

In operation, the closing of thermostat switch 15SW indicating a demand for heat supplies power to the ignition circuit 17 through diode D5 and heater thermistor H1. SCR Q3 is triggered repetitively, causing sparking across electrodes 19 and the resultant voltage induced across resistor R3 causes triggering of triac Q1 to energize gas valve winding 13W, thereby supplying gas to burner 11. The sparking at electrodes 19 causes combustion of the fuel and the resultant conductive path across electrodes 19 discharges capacitor C4 via lead 21 to prevent further triggering of SCR Q3. Following initial triggering, triggering of triac Q1 is maintained by the same "latching" arrangement of FIG. 2, this circuit being no different in that respect.

If ignition is not successful, however, continued energization of heater thermistor H1 by the current drawn therethrough by triggering of SCR Q3 causes heating of thermistor TH1 which is thus heated within a predetermined time interval to a threshold temperature at which its resistance is increased sufficiently to prevent further triggering of triac Q1. The heating of thermistor CH maintains thermistor TH1 substantially above ambient temperature in the absence of heating of the latter by thermistor CH, since the temperature of thermistor CH is always maintained substantially at its transition temperature regardless of variations in ambient temperature because of the self-regulating nature of such a "steep slope" thermistor when employed in its self-heating mode. Thus, variations in ambient temperature have little effect on thermistor TH1. Accordingly, upon heating by thermistor H1, thermistor TH1 is initially always substantially at the same temperature regardless of ambient temperature. Accordingly, the time interval required for it to be heated to a threshold temperature at which triggering of triac Q1 is prevented will advantageously be substantially the same under all ambient temperature conditions.

In the event that such a protective deenergization of gas valve winding 13W as above described takes place as a result of an unsuccessful ignition trial, it is assumed that thermostat 15 continues to demand heat and thus thermostat switch 15SW remains closed, continuing to supply power to ignition circuit 17. The resultant continued energization of heater thermistor H1 causes thermistor TH1 to remain above the threshold temperature at which it prevents triggering of triac Q1. Accordingly, the control remains "locked out" of operation following an unsuccessful ignition trial until either or both leads L1 and L2 are disconnected from the source of power or thermostat switch 15SW is opened.

As in the other embodiments, the triggering circuit of this embodiment is operative to assure energization of gas valve winding 13W only if sparking occurs across the electrodes 19 since, until sparking across electrodes 19 takes place, no voltage is induced across resistor R3 which would cause initial triggering of triac Q1. Accordingly, absolutely no gas will be permitted to accumulate at burner 11 even for the predetermined interval of a few seconds required for thermistor TH1 to be heated to its threshold temperature by energization of thermistor H1.

A plenum-temperature sensing thermistor (or draft sensor) as utilized in the controls of FIG. 1 and FIG. 2, may also be employed in the present control. In this case, the additional plenum sensing or draft proving thermistor corresponding with thermistors TH2 and TH3 of the previous embodiments would be connected in series with thermistor TH1 and thus also interconnected with the gate terminal of triac Q1 to prevent triggering of triac Q1 in the manner previously described.

In view of the above, it will be seen that the several objects of the invention are achieved and other advantageous results attained.

As various changes could be made in the above constructions without departing from the gist of the invention, it is intended that all matter contained in the above description or shown in the accompanying drawings shall be interpreted as illustrative.

What is claimed is:

1. Apparatus for controlling the operation of a furnace in response to the demand of a thermostat sensing the temperature in a zone heated by the furnace, the furnace having a burner and an electrically energizable fuel valve which, when energized, supplies fuel to the burner, said apparatus comprising:
   ignition means which, upon energization, generates recurrent sparking for igniting the fuel, said ignition means being energized when the thermostat demands heat and ceasing to generate sparking after ignition of the fuel;
   a triggerable semiconductor current-switching device interconnected with the fuel valve and, when triggered, being conductive for energizing the fuel valve;
   means for initially triggering said switching device only if said ignition means generates sparking and for triggering said switching device after initial triggering thereof as long as the thermostat demands heat;
   said ignition means including a thermistor connected for preventing triggering of said switching device when the thermistor is heated above a predetermined threshold temperature; and
   means for heating said thermistor interconnected with said ignition means and being energized to cause heating of said thermistor when said ignition means generates sparking, said thermistor requiring a predetermined heating time interval to reach said threshold temperature, and means whereby if the fuel is not ignited within said predetermined interval, triggering of said switching device is terminated to prevent fuel from being further supplied to the burner.

2. Furnace control apparatus as set forth in claim 1 wherein said ignition means includes at least one electrode at which said sparking is generated and said means for triggering said switching device comprises a capacitor interconnecting said switching device and said electrode.

3. Furnace control apparatus as set forth in claim 1 wherein the fuel valve includes an inductive winding, said switching device including a triggering terminal and including main terminals in a series circuit with the winding, said capacitor interconnecting one of said main terminals and said eletrode for initial triggering of said switching device, and further comprising another capacitor connected between said triggering terminal and the other side of the winding for continuing triggering of said switching device after initial triggering thereof.

4. Furnace control apparatus as set forth in claim 2 wherein the fuel valve includes an inductive winding, said switching device having a triggering terminal and including main terminals connected in a series circuit with the winding, said capacitor interconnecting said electrode and said triggering terminal, said capacitor supplying triggering current for initial triggering of said switching device upon generation of sparking at said electrode and, after sparking ceases to be generated, said capacitor supplies triggering current for continued triggering after said initial triggering.

5. Furnace control apparatus as set forth in claim 1 wherein said means for heating said thermistor comprises a further thermistor thermally coupled to the first-said thermistor.

6. Furnace control apparatus as set forth in claim 5 wherein each of said thermistors has a positive temperature coefficient and a transition temperature above which the resistance thereof increases relatively abruptly, said further thermistor having a higher transition temperature than that of the first-said thermistor, said thermistors together constituting an electrothermal timer.

7. Furnace control apparatus as set forth in claim 5 wherein said further thermistor is connected for concomitant energization with said ignition means when said ignition means generates sparking, said further thermistor being deenergized when said ignition means ceases to generate sparking.

8. Furnace control apparatus as set forth in claim 7 wherein the resistance of said further thermistor is increased by energization thereof for said predetermined time interval, whereby energization of said means is reduced for causing sparking to be generated at a reduced sparking rate.

9. Furnace control apparatus as set forth in claim 1 further comprising a second triggerable current-switching device which is conductive, when triggered, for causing power to be supplied to the first-said switching device, said second switching device normally being triggered when the thermostat demands heat.

10. Furnace control apparatus as set forth in claim 9 further comprising a second thermistor mounted for sensing the temperature in a plenum of the furnace and connected for preventing triggering of said second switching device, thereby preventing energization of the fuel valve, when heated above a predetermined threshold temperature corresponding to a predetermined maximum permissible temperature in said plenum.

11. Furnace control apparatus as set forth in claim 10 wherein said second thermistor has a positive temperature coefficient of resistivity and a transition temperature above which the resistance thereof increases relatively abruptly.

12. Furnace control apparatus as set forth in claim 9 for controlling the operation of a furnace normally having a forced-air draft supplying the burner, wherein said second switching device includes a triggering terminal and further comprising:
   an additional thermistor mounted for being cooled by the forced draft and connected in a series circuit with said second thermistor and said triggering terminal for preventing triggering of said second switching device when said additional thermistor is heated above a predetermined threshold temperature; and means for heating said additional thermistor, said means normally supplying insufficient heat to cause said fourth thermistor to be heated above said threshold temperature as long as there is sufficient forced-air draft, but causing heating of said additional thermistor above said threshold temperatures thereby preventing energization of the fuel valve if there is insufficient forced-air draft.

13. Furnace control apparatus as set forth in claim 12 wherein said additional thermistor has a positive temperature coefficient of resistivity and a transition temperature above which the resistance thereof increases relatively abruptly, and said means for heating said additional thermistor comprises another thermistor having a positive temperature coefficient of resistivity and a transition temperature higher than that of said additional thermistor and above which the resistance thereof increases relatively abruptly.

14. Furnace control apparatus as set forth in claim 9 wherein each of said switching devices comprises a triac.

15. Furnace control apparatus as set forth in claim 9 wherein said second switching device includes a triggering terminal and main terminals, said main terminals being connected for supplying power to the first-said switching device, said thermistor being connected with the triggering terminal of said second switching device for preventing triggering thereof and thereby preventing triggering of the first-said switching device when said thermistor is heated above said threshold temperature.

16. Furnace control apparatus as set forth in claim 1 further comprising means for delaying generation of sparking by said ignition means comprising:
a thermistor having a positive temperature coefficient and connected for preventing generations of sparking by said ignition means until heated above a predetermined threshold temperature; and
means, when energized, for heating the last-said thermistor and being energized for causing heating of the last-said thermistor upon a demand by the thermostat for heat, the last-said thermistor requiring a predetermined heating time interval to reach said threshold temperature.

17. Furnace control apparatus as set forth in claim 16 wherein the last-said thermistor has a positive temperature coefficient of resistivity and a transition temperature above which the resistance thereof increases relatively abruptly, and said means for heating the last-said thermistor comprises another thermistor having a positive temperature coefficient of resistivity and a transition temperature higher than that of said last-said thermistor and above which the resistance thereof increases relatively abruptly.

18. Apparatus for controlling the operation of a furnace in response to the demand of the thermostat sensing the temperature in a zone heated by the furnace, the furnace having a burner and an electrically energizable fuel valve which, when energized, supplies fuel to the burner, said apparatus being exposed to an environment having normal variations in ambient temperature and comprising:
ignition means which, upon energization, generates recurrent sparknig for igniting the fuel, said ignition means being energized when the thermostat demands heat and ceasing to generate sparking after ignition of the fuel;
a triggerable semiconductor current-switching device interconnected with the fuel valve and, when triggered, being conductive for energizing the fuel valve;
means for initially triggering said switching device only if said ignition means generates sparking and for continuing triggering of said switching device after initial triggering thereof as long as the thermostat demands heat;
said ignition means including a thermistor connected for preventing triggering of said switching device when the thermistor is heated above a predetermined threshold temperature;
first means for heating said thermistor interconnected with said ignition means and being energized to cause heating of said thermistor when said ignition means generates sparking, said thermistor requiring a predetermined heating time interval to reach said threshold temperature, whereby if the fuel is not ignited within said predetermined interval, triggering of said switching device is terminated to prevent fuel from being further supplied to the burner; and
second means for heating said thermistor adapted for being continuously energized to maintain the temperature of said thermistor substantially above ambient temperature but below said threshold temperature in the absence of heating thereof by said first heating means, whereby said heating time interval thereof is substantially unaffected by variations in ambient temperature.

19. Furnace control apparatus as set forth in claim 18 wherein said first and second means for heatnig said thermistor comprise respective first and second heating thermistors each thermally coupled to first-said thermistor.

20. Furnace control apparatus as set forth in claim 19 wherein each of said thermistors has a positive temperature coefficient of resistivity and a transition temperature above which the resistance thereof increases relatively abruptly.

21. Furnace control apparatus as set forth in claim 20 wherein the transition temperature of said first heating thermistor is higher than the transition temperature of first-said thermistor, and the transition temperature of the first -said thermistor is higher than the transition temperature of said second heating thermistor, the latter temperature being substantially greater than the highest normally expected ambient temperature.

References Cited

UNITED STATES PATENTS

| | | | |
|---|---|---|---|
| 3,399,948 | 9/1968 | Myers et al. | 431—71X |
| 3,447,880 | 6/1969 | Potts et al. | 431—66 |
| 3,463,963 | 8/1969 | Fairley et al. | 431—66X |
| 3,488,132 | 1/1970 | Fairley et al. | 431—66 |
| 3,510,236 | 5/1970 | Potts | 431—66X |

CARROLL B. DORITY, JR., Primary Examiner

U.S. Cl. X.R.

431—29